US010557357B2

(12) United States Patent
Kondo et al.

(10) Patent No.: US 10,557,357 B2
(45) Date of Patent: Feb. 11, 2020

(54) SEAL STRUCTURE

(71) Applicant: MITSUBISHI HITACHI POWER SYSTEMS, LTD., Kanagawa (JP)

(72) Inventors: Takahiro Kondo, Yokohama (JP); Shinya Hashimoto, Yokohama (JP); Kenta Taniguchi, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 313 days.

(21) Appl. No.: 15/507,436

(22) PCT Filed: Jul. 7, 2015

(86) PCT No.: PCT/JP2015/069520
§ 371 (c)(1),
(2) Date: Feb. 28, 2017

(87) PCT Pub. No.: WO2016/047237
PCT Pub. Date: Mar. 31, 2016

(65) Prior Publication Data
US 2017/0284218 A1 Oct. 5, 2017

(30) Foreign Application Priority Data
Sep. 26, 2014 (JP) .................................. 2014-196771

(51) Int. Cl.
*F01D 9/02* (2006.01)
*F01D 11/10* (2006.01)
(Continued)

(52) U.S. Cl.
CPC .............. *F01D 9/023* (2013.01); *F01D 11/10* (2013.01); *F01D 11/003* (2013.01); *F01D 25/24* (2013.01)

(58) Field of Classification Search
CPC ........ F01D 11/00; F01D 11/005; F01D 11/10; F01D 9/023; F01D 11/001; F01D 11/003;
(Continued)

(56) References Cited

U.S. PATENT DOCUMENTS 6,860,108 B2 * 3/2005 Soechting ............... F01D 9/023
60/39.37
7,797,948 B2 * 9/2010 Weaver ................... F01D 9/023
277/399
(Continued)

FOREIGN PATENT DOCUMENTS

JP 62-185363 11/1987
JP 2000-257862 9/2000
(Continued)

OTHER PUBLICATIONS

International Search Report dated Sep. 1, 2015 in corresponding International (PCT) Application No. PCT/JP2015/069520, with English translation.
(Continued)

*Primary Examiner* — Bryan M Lettman
*Assistant Examiner* — Charles W Nichols
(74) *Attorney, Agent, or Firm* — Wenderoth, Lind & Ponack, L.L.P.

(57) ABSTRACT

A seal structure includes: a first member and a second member facing a combustion gas flow passage; a third member on an outer side of the combustion gas flow passage; a heat-resistant coating on at least one of a first end face and a second end face, both of the first end face and the second end face being closer to the combustion gas flow passage; and a contact part in each of the first end face and the second end face, further on the outer side of the combustion gas flow passage than the heat-resistant coating. The contact part is configured to restrict relative movement
(Continued)

of the first member and the second member by directly or indirectly coming into contact with the first member and the second member in a state where a clearance is left between the heat-resistant coating and the end face facing the heat-resistant coating.

3 Claims, 7 Drawing Sheets

(51) Int. Cl.
*F01D 11/00* (2006.01)
*F01D 25/24* (2006.01)

(58) Field of Classification Search
CPC .. F01D 11/14; F01D 25/12; F02C 7/24; F02C 7/28; F05D 2240/11; F05D 223/31; F05D 2240/55; F05D 2260/201; F16J 15/4476; F16J 15/162; F16J 15/447–4478
See application file for complete search history.

(56) References Cited

U.S. PATENT DOCUMENTS

| 8,491,259 B2 * | 7/2013 | Sutcu | F01D 9/023 |
| | | | 415/173.7 |
| 2006/0123797 A1 * | 6/2006 | Zborovsky | F01D 9/041 |
| | | | 60/800 |

FOREIGN PATENT DOCUMENTS

| JP | 2006-105076 | 4/2006 |
| JP | 2009-167905 | 7/2009 |
| JP | 2012-530870 | 12/2012 |
| JP | 2013-164071 | 8/2013 |
| JP | 2014-58893 | 4/2014 |

OTHER PUBLICATIONS

Written Opinion of the International Searching Authority dated Sep. 1, 2015 in corresponding International (PCT) Application No. PCT/JP2015/069520, with English translation.

* cited by examiner

SEAL STRUCTURE

CROSS-REFERENCE TO RELATED APPLICATION

The present application claims priority based on Japanese Patent Application No. 2014-196771 filed on Sep. 26, 2014, the contents of which are incorporated herein by reference.

TECHNICAL FIELD

The present invention relates to a seal structure.

BACKGROUND ART

In a gas turbine, air pressurized in a compressor is mixed with fuel in a combustor to generate combustion gas that is a high-temperature fluid, and this combustion gas is introduced into a combustion gas flow passage of a turbine in which vanes and blades are alternately installed. The gas turbine rotates the blades and a rotor by the combustion gas flowing through the combustion gas flow passage. Thus, the gas turbine outputs the energy of the combustion gas as rotary energy, and imparts a rotary driving force to the compressor and a generator.

A clearance is provided between a transition piece of the combustor and a shroud of a first-stage vane of the turbine to prevent contact therebetween to thermal expansion. In this clearance, a seal member is provided to prevent casing air from leaking into the combustion gas flow passage (e.g., Japanese Patent Publication No. 2009-167905).

The surfaces of components of the gas turbine exposed to the combustion gas have a thermal barrier coating (TBC) applied thereto as a heat-resistant coating to enhance the heat resistance. This thermal barrier coating is applied to those regions that reach high temperatures by being exposed to the combustion gas. The thermal barrier coating is applied not only to a gas path surface facing the combustion gas flow passage, but also to a lateral wall surface intersecting with the gas path surface, on the side of the surface closer to the combustion gas flow passage.

Technical Problem

In such a gas turbine, the temperatures of members composing the gas turbine, such as the transition pieces, blades, vanes, and casings, are higher when the gas turbine is in a steady operation state than when the gas turbine is in a stopped state. In the course of the gas turbine temperature rising at startup, differences in temperature among the members composing the gas turbine result in differences in thermal elongation. Accordingly, clearances between the members vary with the operation state of the gas turbine, from the stopped state to the steady operation state of the gas turbine. Thus, if a clearance between adjacent members is reduced due to the difference in thermal elongation, the lateral wall surfaces facing each other may come in contact with each other, causing damage to the heat-resistant coating due to the occurrence of a phenomenon such as detachment of the thermal barrier coating.

SUMMARY OF INVENTION

The present invention provides a seal structure that can prevent damage to the heat-resistant coatings of adjacent members even if these members come in contact with each other.

Solution to Problem

A seal structure in a first aspect of the present invention includes: a first member disposed so as to face a combustion gas flow passage formed around a rotor axis; a second member disposed adjacent to the first member so as to face the combustion gas flow passage; a third member disposed on the outer side of the combustion gas flow passage between a first end face of the first member and a second end face of the second member facing the first end face, and engaging with the first member and the second member; a heat-resistant coating formed on at least one of the first end face and the second end face, on the side of the face closer to the combustion gas flow passage; and a contact part disposed in the first end face and the second end face, further on the outer side of the combustion gas flow passage than the heat-resistant coating, and, when the first member and the second member move relatively toward each other, restricting the relative movement by directly coming in contact with the first member and the second member, or indirectly coming in contact with the first member and the second member through the third member, in a state where a clearance is left between the heat-resistant coating and at least one of the first end face and the second end face facing the heat-resistant coating.

According to this configuration, before the first end face and the second end face come in contact with each other, the contact part comes in contact with the first end face and the second end face, or with at least one face, on which the heat-resistant coating is not formed, through the third member. It is therefore possible to restrict the relative movement of the first member and the second member so that the first end face and the second end face do not approach each other beyond a position at which the contact part directly comes in contact with the first end face and the second end face, or indirectly comes in contact with the first end face and the second end face through the third member. Thus, contact between the first end face of the first member on which the heat-resistant coating is formed and the second end face of the second member, adjacent to the first member, on which the heat-resistant coating is formed can be prevented.

A seal structure in a second aspect of the present invention is the seal structure according to the first aspect, wherein the first member may be a combustor; the second member may be a vane disposed on the downstream side in a rotor axis direction relative to the combustor; and the third member may be a seal member disposed on the outer side of the combustion gas flow passage.

According to this configuration, the first member is a combustor, the second member is a vane adjacent to the downstream side of the combustor in the rotor axis direction, and the third member is a seal member disposed between the combustor and the vane. Thus, the seal structure that can protect the heat-resistant coating in the vicinity of the outlet of the combustor can be easily employed.

A seal structure in a third aspect of the present invention is the seal structure according to the second aspect, wherein the seal member may include: cooling channels formed in a certain region extending in a circumferential direction based on the rotor axis, at positions including a position on the upstream side in the rotor axis direction relative to a leading edge of the vane facing the upstream side in the rotor axis direction; and a third end face having a plurality of openings which are provided in the circumferential direction and from which cooling air flowing through the cooling channels is discharged.

According to this configuration, it is possible to effectively cool the seal member in the vicinity of the leading edge that tends to reach a high temperature as the combustion gas flowing into the combustion gas flow passage impinges on the leading edge and is thereby entrapped. Specifically, as the combustion gas impinges on the leading edge, the part of the seal member on the upstream side of the leading edge in the rotor axis direction reaches a higher temperature than the other part in the circumferential direction. It is therefore possible to efficiently supply cooling air to that part that reaches a higher temperature and cool the seal member by providing the cooling channels having the openings in the seal member located on the upstream side of the leading edge in the rotor axis direction. As a result, the flow rate of cooling air passed through the cooling channels to cool the seal member can be reduced.

A seal structure in a fourth aspect of the present invention is the seal structure according to the third aspect, wherein the seal member may include a clearance forming portion that protrudes from the third end face toward the downstream side in the rotor axis direction and has a fourth end face facing the downstream side in the rotor axis direction.

According to this configuration, the clearance forming portion protrudes further toward the downstream side in the rotor axis direction than the third end face. Thus, the openings from which the cooling air is discharged are not blocked, so that the seal member is stably cooled.

A seal structure in a fifth aspect of the present invention is the seal structure according to the fourth aspect, wherein the fourth end face may be disposed so as to face the contact part of the second end face of the vane facing the upstream side in the rotor axis direction.

According to this configuration, even if the clearance between the third end face in which the openings are disposed and the lateral end face of the vane facing the third end face from the downstream side in the rotor axis direction is reduced, the contact part of the lateral end face comes in contact with the fourth end face before the openings are blocked. Thus, a space in front of the openings can be stably secured, so that the required cooling air can be continuously discharged from the openings even if the clearance between the end face and the lateral end face is reduced.

A seal structure in a sixth aspect of the present invention is the seal structure according to the first aspect, wherein the first member and the second member may be ring segments adjacent to each other in a circumferential direction based on the rotor axis, and the third member may be a seal plate disposed between the adjacent ring segments.

According to this configuration, the first member and the second member are ring segments adjacent to each other in the circumferential direction, and the third member is a seal plate disposed between the adjacent ring segments. Thus, the seal structure that can protect the heat-resistant coating can be easily employed between a pair of ring segments adjacent to each other in the circumferential direction.

Advantageous Effects of Invention

According to the seal structure of the present invention, it is possible to prevent contact between the surfaces of adjacent members facing each other at a contact part and thus prevent damage to the heat-resistant coatings.

DESCRIPTION OF EMBODIMENTS

First Embodiment

A first embodiment according to the present invention will be described below with reference to FIG. 1 to FIG. 6.

Figure 1:
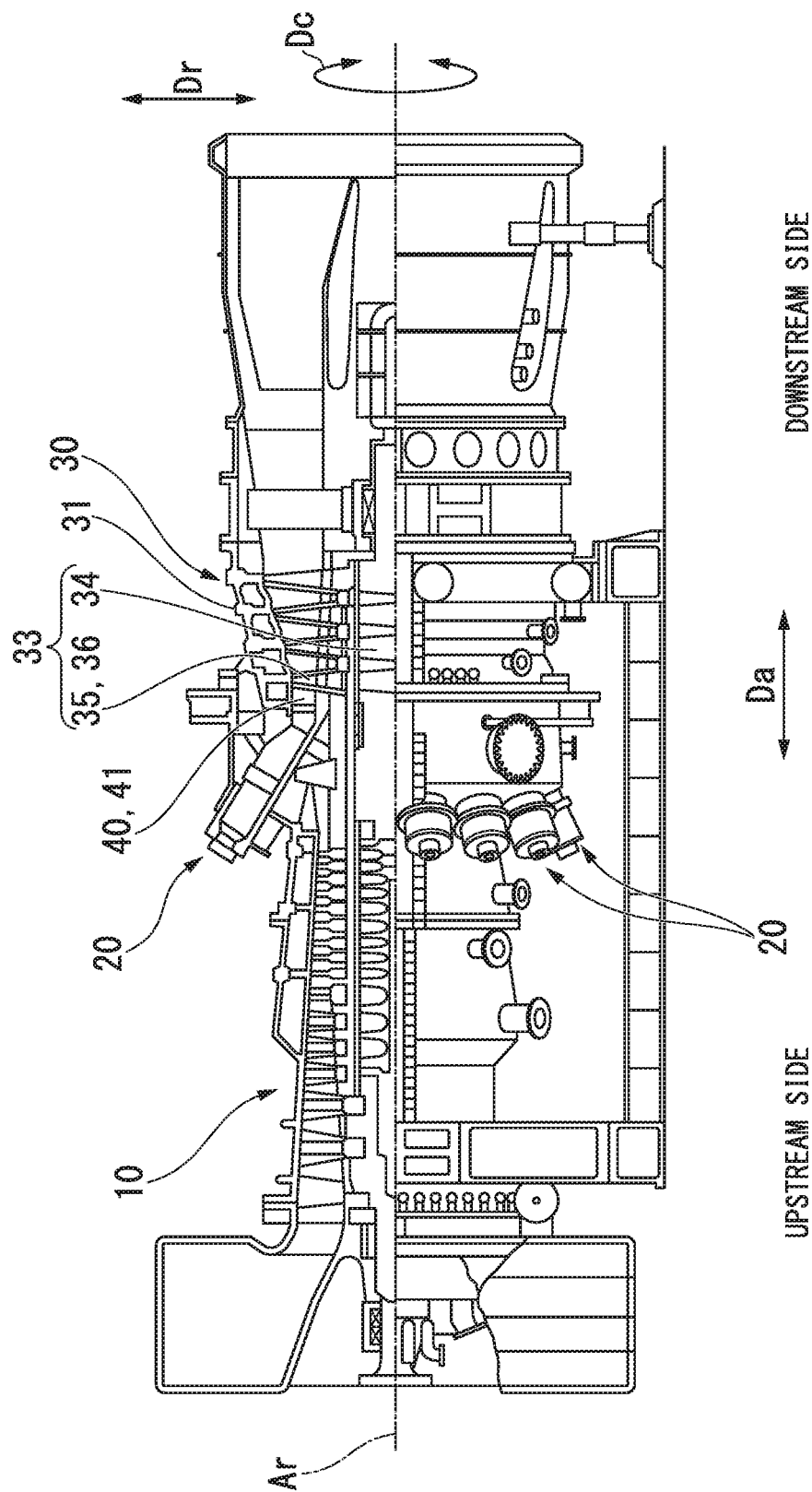
FIG. 1 is a cutaway side view of main parts of a gas turbine in an embodiment of the present invention.
Figure 2:
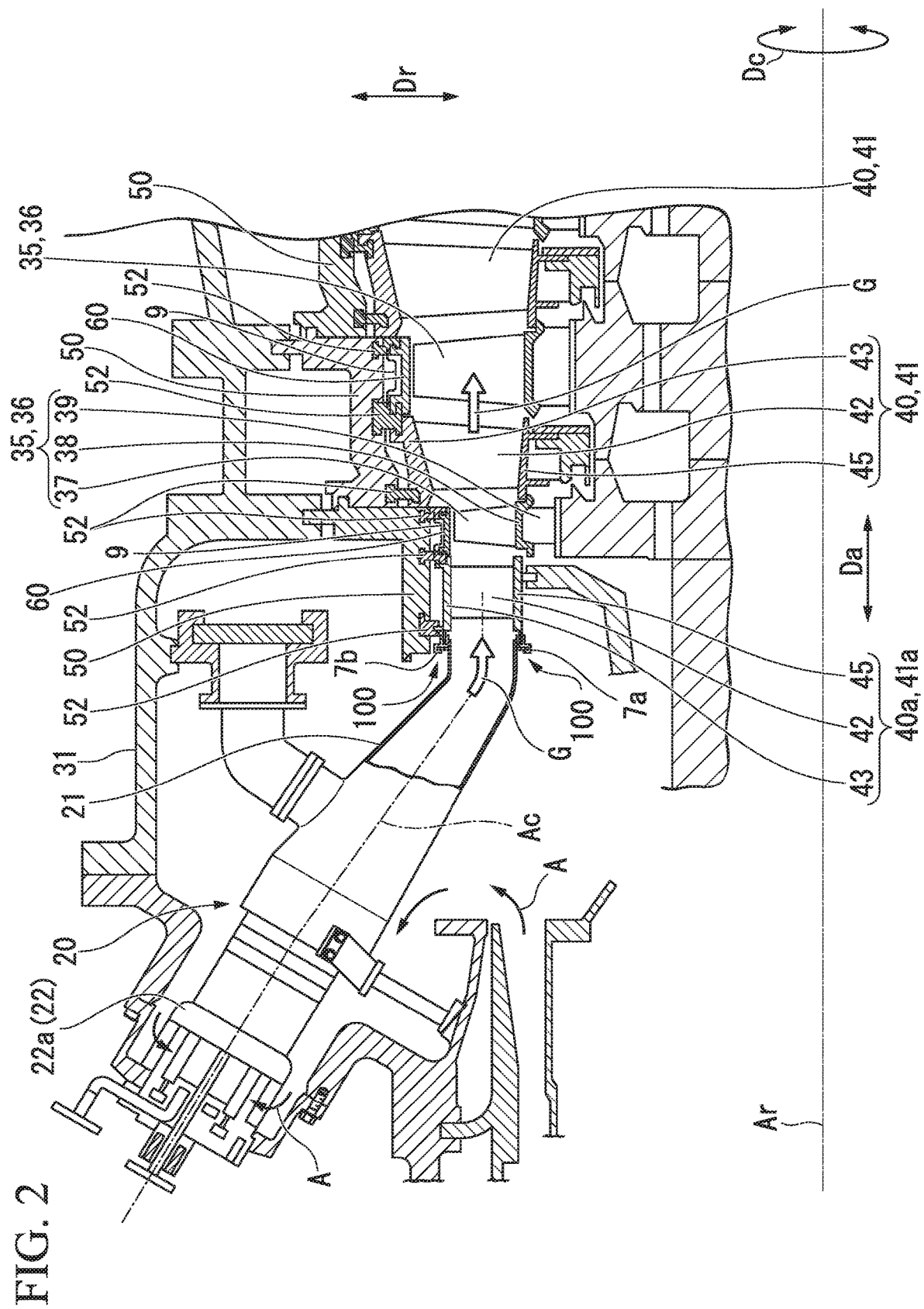
FIG. 2 is a sectional view of main parts of the gas turbine in the embodiment of the present invention.

As shown in FIG. 1 and FIG. 2, a gas turbine 1 includes a compressor 10 that generates compressed air A by compressing outside air, a plurality of combustors 20 that generate combustion gas G by mixing fuel to the compressed air A and combusting the mixture, and a turbine 30 driven by the combustion gas G.

The turbine 30 includes a casing 31, and a turbine rotor 33 that rotates around a rotor axis Ar inside the casing 31. For example, the turbine rotor 33 is connected to a generator (not shown) that generates electricity as the turbine rotor 33 rotates.

Relative to the turbine 30, the compressor 10 is disposed on one side of the rotor axis Ar. The casing 31 of the turbine 30 has a cylindrical shape around the rotor axis Ar. Part of the compressed air A is supplied as cooling air from the compressor 10 to the turbine 30 and the combustors 20.

The plurality of combustors 20 are mounted on the casing 31 at intervals in a circumferential direction Dc relative to the rotor axis Ar.

Here, the direction in which the rotor axis Ar extends will be referred to as a rotor axis direction Da. In the rotor axis direction Da, the side on which the turbine 30 is disposed relative to the combustors 20 will be referred to as the downstream side, and the opposite side will be referred to as the upstream side.

A circumferential direction Dc based on the rotor axis Ar will be referred to simply as the circumferential direction Dc, and a radial direction Dr based on the rotor axis Ar will be referred to simply as the radial direction Dr.

In the radial direction Dr, the side away from an axis line Ac will be referred to as the outer side in the radial direction Dr, and the opposite side will be referred to as the inner side in the radial direction Dr.

As shown in FIG. 2, the turbine rotor 33 has a rotor main body 34 extending in the rotor axis direction Da around the rotor axis Ar, and a plurality of blade rows 35 arrayed in the rotor axis direction Da and mounted on the rotor main body 34. The blade rows 35 each have a plurality of blades 36 that are arrayed in the circumferential direction Dc relative to the rotor axis Ar and mounted around the rotor axis Ar. The blade 36 has a blade main body 37 extending in the radial direction Dr, a platform 38 provided on the inner side of the blade main body 37 in the radial direction Dr, and a blade root 39 provided on the inner side of the platform 38 in the radial direction Dr. The blade 36 is fixed to the rotor main body 34 as the blade root 39 is embedded into the rotor main body 34.

Vane rows 40 are disposed respectively on the upstream side of the plurality of blade rows 35. The vane rows 40 are each composed of a plurality of vanes 41 arrayed in the circumferential direction Dc. Each vane 41 has a vane main body 42 extending toward the outer side in the radial direction Dr, an outer shroud 43 provided on the outer side of the vane main body 42 in the radial direction Dr, and an inner shroud 45 provided on the inner side of the vane main body 42 in the radial direction Dr.

A blade ring 50 having a cylindrical shape around the rotor axis Ar is disposed on the outer side of the blade row 35 and the vane row 40 in the radial direction Dr, on the inner side of the casing 31 in the radial direction Dr. The blade ring 50 is fixed to the casing 31. The outer shroud 43 of the vane 41 and the blade ring 50 are coupled together by a heat shield ring 52.

A plurality of ring segments 60 arrayed in the circumferential direction Dc around the rotor axis Ar are disposed between the outer shrouds 43 of the vane rows 40 adjacent to each other in the rotor axis direction Da. The plurality of ring segments 60 arrayed in the circumferential direction Dc form an annular shape. The blade row 35 is disposed on the inner side of the ring segments 60 in the radial direction Dr. All the plurality of ring segments 60 arrayed in the circumferential direction Dc are coupled to the blade ring 50 by the heat shield ring 52.

A combustion gas flow passage Pg through which the combustion gas G flows is formed inside a transition piece 21 of the combustor 20, to be described later, and inside the casing 31 of the turbine 30. The combustion gas flow passage Pg inside the casing 31 of the turbine 30 is defined annularly around the rotor main body 34 by the inner shrouds 45 and the outer shrouds 43 of the plurality of vanes 41 composing the vane row 40, the platforms 38 of the plurality of blades 36 composing the blade row 35 on the downstream side of the vane row 40, and the ring segments 60 facing the platforms 38.

The combustor 20 includes the transition piece 21 that sends the high-temperature high-pressure combustion gas G to the turbine 30, and a fuel supply unit 22 that supplies the fuel and the compressed air A into the transition piece 21.

A flame is formed inside the fuel supply unit 22. The fuel supply unit 22 has a combustor basket 22a having a tubular shape around the axis line Ac.

The transition piece 21 is connected to the combustor basket 22a. The transition piece 21 supplies the high-temperature high-pressure combustion gas G generated in the combustor basket 22a to the turbine 30. The transition piece 21 has a tubular shape. Specifically, an outlet opening of the transition piece 21 located on the downstream side in the rotor axis direction Da has a roughly quadrangular shape. Accordingly, the combustion gas flow passage Pg inside the transition piece 21 is defined by an inner circumferential surface 21a of the tubular transition piece 21. The transition piece 21 of this embodiment is a first member in a seal structure 100 of the first embodiment. The transition piece 21 of this embodiment has an outlet flange 210 (FIG. 3) that is located on the downstream side in the rotor axis direction Da and protrudes in the radial direction Dr from an outer circumferential surface of the transition piece 21.

The seal structure 100 prevents the compressed air A inside the casing 31 from leaking toward the combustion gas flow passage Pg while preventing contact between the surfaces of adjacent members facing each other. The seal structure 100 of the first embodiment is disposed between the combustor 20 and the vane row 40 of the turbine 30 adjacent to the downstream side of the combustor 20 in the rotor axis direction Da. Specifically, the seal structure 100 of the first embodiment seals the clearance between the transition piece 21 and a first vane row 40a that are adjacent to each other in the rotor axis direction Da, without allowing contact between heat-resistant coatings 130 formed on the transition piece 21 and the first vane row 40a.

Figure 3:
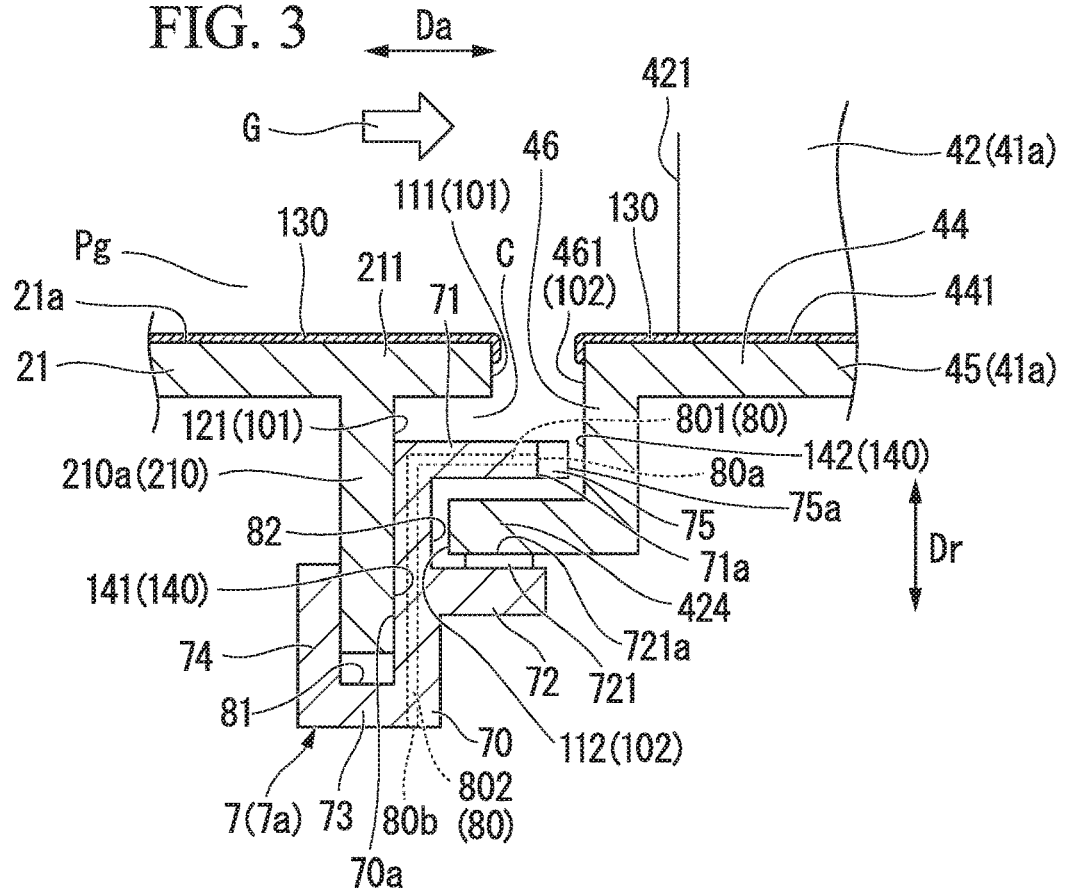
FIG. 3 is an enlarged view of main parts illustrating a seal structure in a first embodiment of the present invention.

The seal structure 100 shown in FIG. 3 that is located on the inner side in the radial direction Dr relative to the combustion gas flow passage Pg is a structure including the transition piece 21, the inner shrouds 45 of the first vane row 40a, and a seal member 7 (inner seal member 7a). The transition piece 21 is disposed on the upstream side in the rotor axis direction Da. The inner shrouds 45 are disposed on the downstream side in the rotor axis direction Da. The seal member 7 (inner seal member 7a) is disposed on the inner side in the radial direction Dr relative to the combustion gas flow passage Pg, between the transition piece 21 and the inner shrouds 45. On the other hand, the seal structure 100 located on the outer side in the radial direction Dr relative to the combustion gas flow passage Pg is a structure including the transition piece 21, the outer shrouds 43 of the first vane row 40a, and the seal member 7 (outer seal member 7b). The outer shrouds 43 are disposed on the downstream side in the rotor axis direction Da. The seal member 7 (outer seal member 7b) is disposed on the outer side in the radial direction Dr relative to the combustion gas flow passage Pg, between the transition piece 21 and the outer shrouds 43. Both structures are symmetrical with respect to the axis line Ac of the combustor. Both structures are combined and integrated to form the seal structure. The components of the seal structure 100 include the heat-resistant coating 130 and a contact part 140. The heat-resistant coating 130 is formed on the surfaces of the transition piece 21 and the first vane row 40a that are exposed to the combustion gas G. The contact part 140 restricts the relative movement of the transition piece 21 and the first vane row 40a toward each other.

The outlet flange 210 has a substantially quadrangular annular shape so as to cover the periphery of the outlet opening of the transition piece 21. The outlet flange 210 protrudes from the outer circumferential surface of the transition piece 21 toward the outer side of the combustion gas flow passage Pg. Specifically, the outlet flange 210 has a pair of circumferential flange portions 210a and a pair of radial flange portions (not shown).

The pair of circumferential flange portions 210a each protrude from a part of the outer circumferential surface of the transition piece 21 that extends in the circumferential direction Dc. The pair of circumferential flange portions 210a are disposed so as to face each other in the radial direction Dr across the outlet opening.

As shown in FIG. 3, a rear end 211 of the transition piece 21 located on the downstream side in the rotor axis direction Da extends further toward the downstream side in the rotor axis direction Da than the outlet flange 210.

Here, the surface of the transition piece 21 of the first embodiment facing the downstream side in the rotor axis direction Da will be referred to as a first end face 101. Specifically, the first end face 101 of the first embodiment is formed by a main body first end face 111 that is the face of the rear end 211 facing the downstream side in the rotor axis direction Da, and a flange first end face 121 that is the face of the outlet flange 210 facing the downstream side in the rotor axis direction Da.

Of the vane rows 40, the first vane row 40a is disposed on the most upstream side in the rotor axis direction Da. The first vane row 40a is composed of a plurality of first vanes 41a adjacent to one another in the circumferential direction Dc. The first vane row 40a is supported by the blade ring 50. The gap between the first vane row 40a and the transition piece 21 of the combustor 20 is sealed by the seal member 7. The first vane 41a of this embodiment is a second member in the seal structure 100 of the first embodiment. The first vane 41a is adjacent to the downstream side in the rotor axis direction Da of the transition piece 21 that is the first member.

As shown in FIG. 3, a shroud main body 44 having a gas path surface 441 facing the combustion gas flow passage Pg and a lateral wall 46 intersecting with the gas path surface 441 are formed in the inner shroud 45 and the outer shroud 43 of the first vane 41a. The lateral wall 46 has a lateral end face 461 facing the upstream side in the rotor axis direction Da. The lateral end face 461 is disposed so as to face the main body first end face 111 of the rear end 211 of the transition piece 21 and the flange first end face 121 of the outlet flange 210, with a clearance left in the rotor axis direction Da between the lateral end face 461 and the end faces. A projection 424 extending from the lateral end face 461 toward the upstream side in the rotor axis direction Da is formed on the lateral wall 46.

The projection 424 is formed at a position away from the gas path surface 441 of the lateral end face 461, on the inner side in the radial direction Dr or the outer side in the radial direction Dr of the gas path surface 441. The projection 424 has an annular shape around the rotor axis Ar. A projection second end face 112 of the projection 424 that faces the upstream side in the rotor axis direction Da is disposed so as to face the flange first end face 121 of the outlet flange 210, with a clearance left therebetween in the rotor axis direction Da.

Here, the face of the first vane 41a of the first embodiment that faces the upstream side in the rotor axis direction Da will be referred to as a second end face 102. Specifically, the second end face 102 of the first embodiment is formed by the lateral end face 461 and the projection second end face 112 of the inner shroud 45 and the outer shroud 43.

The seal member 7 is a transition piece seal that is disposed between the combustor 20 and the first vane row 40a that is disposed on the downstream side of the combustor 20 in the rotor axis direction Da and faces the combustion gas flow passage Pg. The seal member 7 seals the gap between the outlet flange 210 of the transition piece 21 of the combustor 20 and the inner shrouds 45 and the outer shrouds 43 of the first vanes 41a of the first vane row 40a. The seal member 7 of this embodiment is a third member in the seal structure 100 of the first embodiment.

The seal member 7 engages with the transition piece 21 and the inner shrouds 45 or the outer shrouds 43 of the first vanes 41a between the main body first end face 111 and the flange first end face 121 constituting the first end face 101 and the lateral end face 461 and the projection second end face 112 constituting the second end face 102.

The seal member 7 of this embodiment is disposed along the circumferential flange portion 210a of the substantially quadrangular annular outlet flange 210. The seal member 7 (inner seal member 7a) engages with the circumferential flange portion 210a on the inner side in the radial direction Dr and with the inner shrouds 45 of the first vanes 41a. The seal member 7 (outer seal member 7b) engages with the circumferential flange portion 210a on the outer side in the radial direction Dr and with the outer shrouds 43 of the first vanes 41a.

The shapes of the seal member 7 on the inner side in the radial direction Dr (inner seal member 7a) and the seal member 7 on the outer side in the radial direction Dr (outer seal member 7b) are roughly symmetrical with respect to the axis line Ac of the transition piece 21. In the following description, therefore, the seal structure 100 including the inner seal member 7a engaging with the inner shroud 45 on the inner side in the radial direction Dr will be mainly described as a typical example, but the same description is applicable to the outer seal member 7b as well. In the following description, "seal member 7" will be used as the name and the reference sign of the inner seal member 7a.

The seal member 7 is disposed on the outer side of the combustion gas flow passage Pg through which the combustion gas G flows (on the inner side in the radial direction Dr). As shown in FIG. 3, the seal member 7 is disposed in a cavity C that is formed in the clearance between the transition piece 21 and the inner shroud 45 of the first vane 41a. Here, the cavity C in this embodiment is the space formed between the transition piece 21 and the first vane 41a and facing the combustion gas flow passage Pg. Relative to the combustion gas flow passage Pg, the cavity C is formed further on the inner side in the radial direction Dr than the inner circumferential surface 21a of the transition piece 21 and the gas path surface 441 of the first vane 41a. The cavity C is the space located further on the inner side in the radial direction Dr than the rear end 211 of the transition piece 21 and defined between the outlet flange 210 and the lateral end face 461 in the rotor axis direction Da.

The seal member 7 is a member that is formed annularly in the circumferential direction Dc, with a constant shape in cross-section including the axis line Ac and spreading in the radial direction Dr. The seal member 7 of this embodiment has a main body part 70, a first protrusion 71, a second protrusion 72, a third protrusion 73, and a fourth protrusion 74. In the cross-section including the axis line Ac and spreading in the radial direction Dr, the main body part 70 extends in the radial direction Dr. In the cross-section including the axis Ac and spreading in the radial direction Dr, the first protrusion 71 protrudes from an end of the main body part 70 toward the downstream side in the rotor axis direction Da. In the cross-section including the axis line Ac and spreading in the radial direction Dr, the second protrusion 72 is located further on the inner side in the radial direction Dr than the first protrusion 71 and extends from the main body part 70 toward the downstream side in the rotor axis direction Da. In the cross-section including the axis line Ac and spreading in the radial direction Dr, the third protrusion 73 protrudes from the end of the main body part 70 located on the inner side in the radial direction Dr toward the upstream side in the rotor axis direction Da. In the cross-section including the axis line Ac and spreading in the radial direction Dr, the fourth protrusion 74 protrudes from the end of the third protrusion 73 located on the upstream side in the rotor axis direction Da toward the outer side in the radial direction Dr. The seal member 7 of this embodiment has cooling channels 80 through which cooling air is discharged from openings 80a.

The main body part 70 of this embodiment has a substantially rectangular shape of which the cross-section including the axis line Ac and spreading in the radial direction Dr is long in the radial direction Dr.

The first protrusion 71 protrudes from the end of the main body part 70 toward the lateral end face 461. The first protrusion 71 of this embodiment has a substantially rectangular parallelepiped shape of which the cross-section including the axis line Ac and spreading in the radial direction Dr is long in the rotor axis direction Da. The first protrusion 71 has an annular shape around the rotor axis Ar. The first protrusion 71 is formed in the space defined in the rotor axis direction Da between the first end face 101 of the rear end 211 of the transition piece 21 and the projection 424. The first protrusion 71 has an end face 71a that is a third end face facing the lateral end face 461 and facing the downstream side in the rotor axis direction Da. In the first protrusion 71, the cooling channels 80 are formed in the rotor axis direction Da. The ends of the cooling channels 80 on the downstream side are connected to the openings 80a having circular shapes in the end face 71a.

The end face 71a of this embodiment is the face at the end of the first protrusion 71 that is the end located on the downstream side in the rotor axis direction Da opposite to the main body part 70. The end face 71a of this embodiment is formed so as to face the lateral end face 461, with a clearance left on the upstream side of the lateral end face 461 in the rotor axis direction Da.

Figure 4:
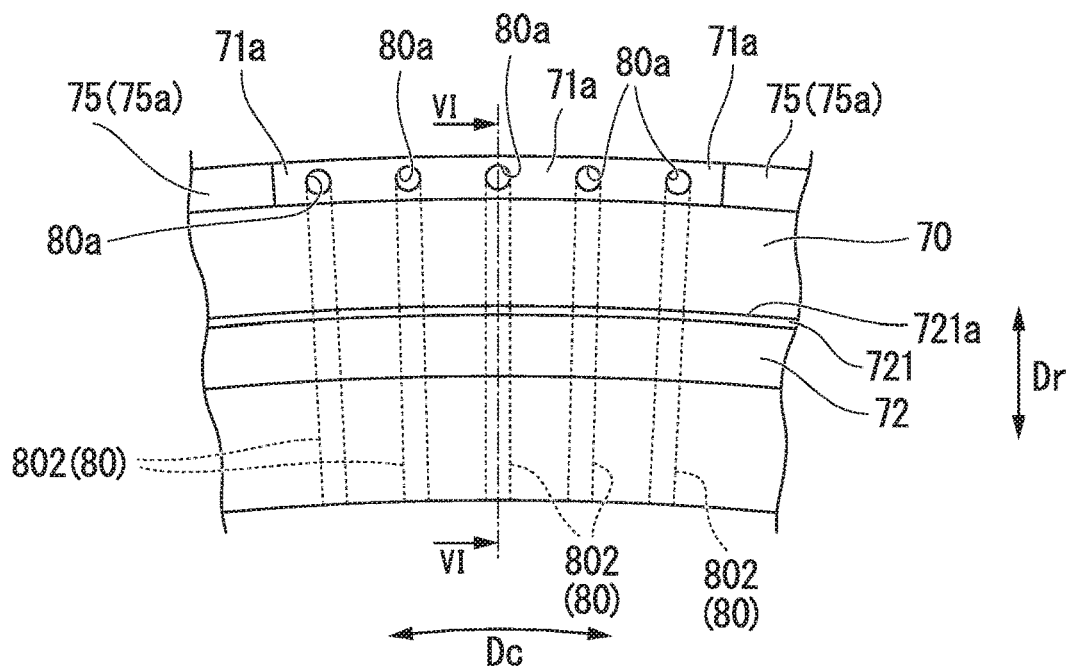
FIG. 4 is an enlarged view of main parts illustrating a seal member as seen from the downstream side in an axial direction in the first embodiment of the present invention.
Figure 5:
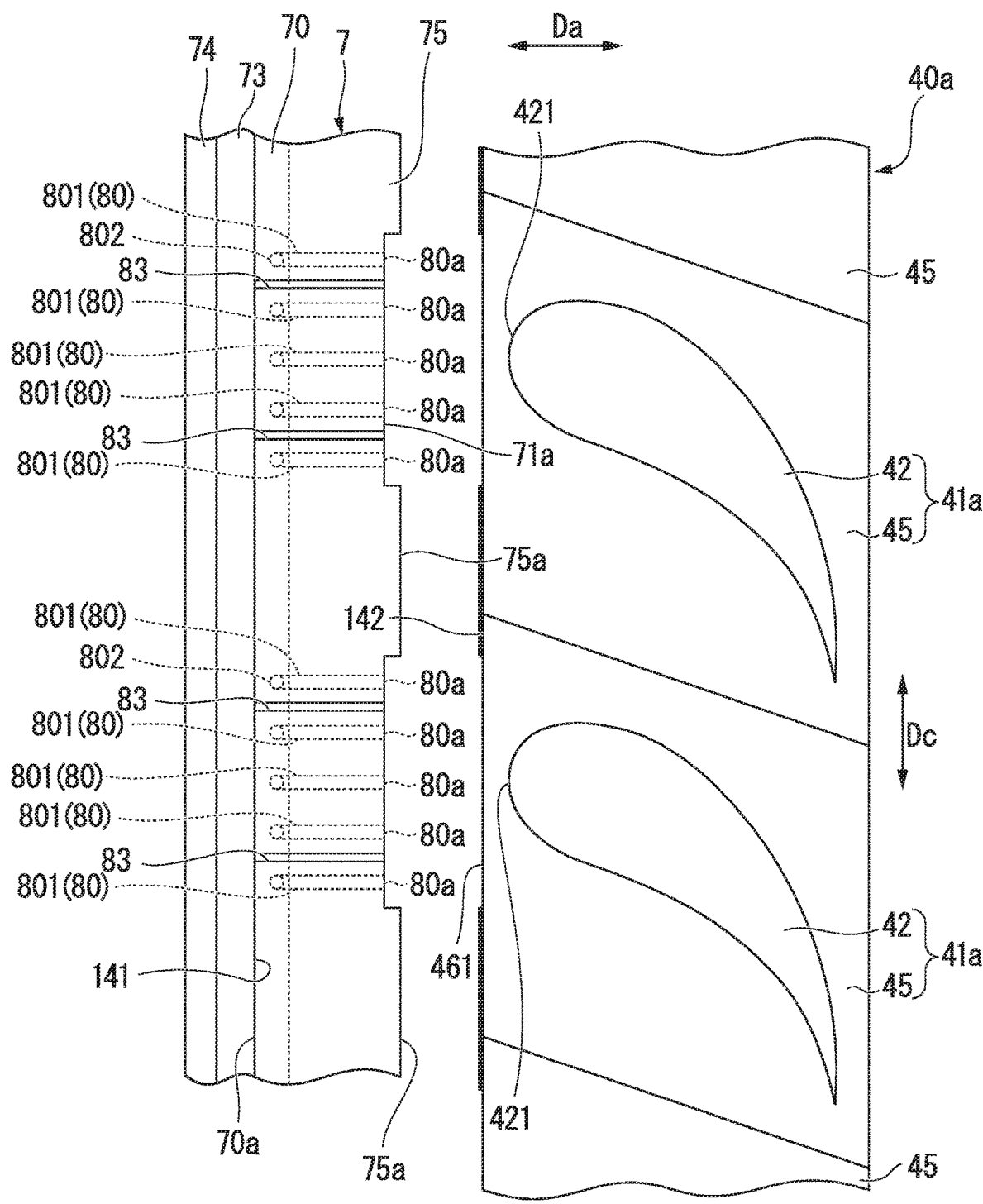
FIG. 5 is a schematic view illustrating the positions of openings of the seal member in the first embodiment of the present invention.

As shown in FIG. 4, the plurality of openings 80a of this embodiment are formed at intervals in the circumferential direction Dc over a predetermined region of the end face 71a. Specifically, as shown in FIG. 5, relative to a leading edge 421 that is a region of the vane main body 42 facing the upstream side in the rotor axis direction Da, the openings 80a of this embodiment are formed in a certain region of the end face 71a extending in the circumferential direction Dc, at positions including a position on the upstream side of the leading edge 421 in the rotor axis direction Da. That is, the openings 80a of this embodiment are formed in a certain area extending in the circumferential direction Dc, at positions including the position that is located on the upstream side of the leading edge 421 in the rotor axis direction Da and corresponds to the leading edge 421, so that the position of the opening 80a in the circumferential direction Dc corresponds to the position at which the leading edge 421 of the vane main body 42 is formed.

As shown in FIG. 5, the first protrusion 71 has a clearance forming portion 75 that protrudes from the end face 71a, where the openings 80a are formed, toward the downstream side in the rotor axis direction Da. The end face of the clearance forming portion 75 facing the downstream side in the rotor axis direction Da faces the lateral end face 461 in the rotor axis direction Da. When seen from the downstream side in the rotor axis direction Da, the clearance forming portion 75 is adjacent to the end face 71a in the circumferential direction Dc. The clearance forming portion 75 has no openings 80a that communicate with the cooling channels 80, and is formed intermittently in the circumferential direction, alternately with the end face 71a, where the openings 80a are formed, in the circumferential direction. Accordingly, if the end face of the clearance forming portion 75 facing the downstream side in the rotor axis direction Da and the lateral end face 461 come in contact with each other due to the differences in thermal elongation among the transition piece 21, the inner shroud 45, and the seal member 7, a third seal surface 75a that is a fourth end face is formed in the end face of the clearance forming portion 75 facing the downstream side in the rotor axis direction Da. However, even if the end face 71a and the lateral end face 461 approach each other and the third seal surface 75a and the lateral end face 461 come in contact with each other, the end face 71a and the lateral end face 461 do not come in contact with each other, but a clearance is reliably left on the downstream side of the end face 71a in the rotor axis direction Da.

Specifically, if the third seal surface 75a that is the end face of the clearance forming portion 75 facing the downstream side in the rotor axis direction Da comes in contact with the lateral end face 461 in the rotor axis direction Da, a second contact part 142 that is a contact part in the first vane 41a being the second member is formed in the lateral end face 461 facing the third seal surface 75a. In FIG. 5, one example of the second contact part 142 formed in the lateral end face 461 is indicated by the thick lines. The second contact part 142 is formed in the outer surface of the lateral end face 461 that comes in contact with the third seal surface 75a in the rotor axis direction Da. However, the second contact part 142 does not have to come in contact with the entire third seal surface 75a, and may come in contact with only a part of the third seal surface 75a.

The second protrusion 72 is located at a position away from the first protrusion 71, on the inner side of the first protrusion 71 in the radial direction Dr, and protrudes from the main body part 70 toward the downstream side in the rotor axis direction Da. The second protrusion 72 has a substantially rectangular parallelepiped shape of which the cross-section including the axis line Ac and spreading in the radial direction Dr is long in the rotor axis direction Da. The second protrusion 72 has an annular shape around the rotor axis Ar. The second protrusion 72 is formed at such a distance from the first protrusion 71 that the projection 424 can be inserted between the second protrusion 72 and the first protrusion 71. A contact seal member 721 is fixed to the second protrusion 72 of this embodiment.

The contact seal member 721 is a metal sheet. The contact seal member 721 is fixed to the surface of the second protrusion 72 facing the first protrusion 71. The contact seal member 721 has a first seal surface 721a that is formed annularly between the contact seal member 721 and the projection 424.

The first seal surface 721a comes in contact with the surface of the projection 424 facing the inner side in the radial direction Dr. The first seal surface 721a of this embodiment is the surface of the contact seal member 721 facing the first protrusion 71 located on the outer side of the contact seal member 721 in the radial direction Dr.

The third protrusion 73 protrudes from the end of the main body part 70 located on the inner side in the radial direction Dr toward the side opposite to the first protrusion 71. The third protrusion 73 of this embodiment has a substantially rectangular parallelepiped shape of which the cross-section including the axis line Ac and spreading in the radial direction Dr is long in the rotor axis direction Da. The third protrusion 73 is formed at a position further on the inner side in the radial direction Dr than the circumferential flange portion 210a.

The fourth protrusion 74 protrudes from the end of the third protrusion 73 located on the upstream side in the rotor axis direction Da toward the outer circumferential surface of the transition piece 21. The fourth protrusion 74 has a substantially rectangular parallelepiped shape of which the cross-section including the axis line Ac and spreading in the radial direction Dr is long in the radial direction Dr. The fourth protrusion 74 is located at a position further on the upstream side in the rotor axis direction Da than the circumferential flange portion 210a, and protrudes from the third protrusion 73.

Figure 6:
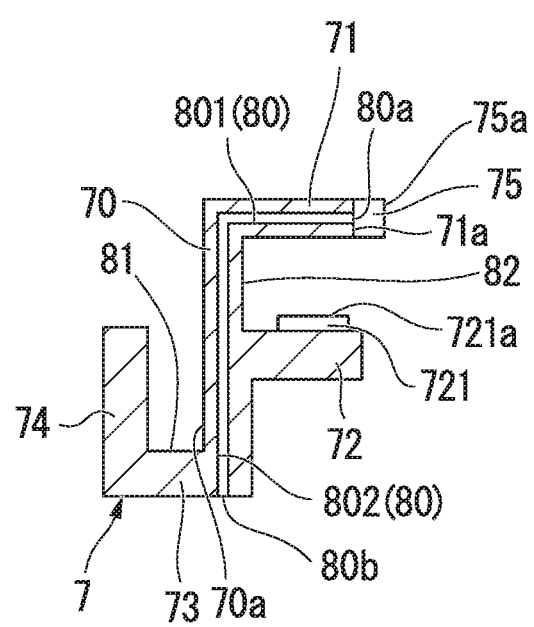
FIG. 6 is a sectional view illustrating the section VI-VI in FIG. 4.

The compressed air A from inside the casing 31 of the turbine 30 is taken into the cooling channels 80 as cooling air, passed through the cooling channels 80, and jetted out from the openings 80a toward the lateral end face 461. The cooling channel 80 of this embodiment has a circular cross-sectional shape. The plurality of cooling channels 80 are formed so as to penetrate the inside of the main body part 70 and the first protrusion 71. Specifically, as shown in FIG. 6, the cooling channel 80 of this embodiment includes an axial channel 801 and a radial channel 802. The axial channel 801 is formed from the opening 80a toward the upstream side in the rotor axis direction Da. The radial channel 802 communicates with the axial channel 801 on the upstream side in the rotor axis direction Da and extends toward the inner side in the radial direction Dr. Part of the combustion gas G impinging on the leading edge 421 of the vane main body 42 is entrapped into the cavity C through the clearance between the rear end 211 of the transition piece 21 and the inner shroud 45. Accordingly, the region including the end face 71a of the first protrusion 71, including the position corresponding to the upstream side in the rotor axis direction Da of the leading edge 421 of the vane main body 42, is exposed to the combustion gas G. In this region, the plurality of cooling channels 80 are disposed in the circumferential direction Dc. The cooling channels 80 are connected to the openings 80a at the ends on the downstream side in the rotor axis direction Da. Thus, it is not necessary to dispose the cooling channels 80 over the entire region of the first protrusion 71 in the circumferential direction Dc. The cooling channels 80 should be disposed at least in some regions extending in the circumferential direction including the end face 71a.

The axial channel 801 extends inside the first protrusion 71, from the opening 80a formed in the end face 71a toward the upstream side in the rotor axis direction Da.

The radial channel 802 extends from an inflow port 80b, formed in the surface of the main body part 70 facing the inner side in the radial direction Dr, toward the outer side in the radial direction Dr. The radial channel 802 communicates with the axial channel 801.

The seal member 7 of this embodiment includes a first engaging part 81 connected to the transition piece 21 of the combustor 20 on the upstream side in the rotor axis direction Da, and a second engaging part 82 connected to the inner shroud 45 of the first vane 41a on the downstream side in the rotor axis direction Da.

The first engaging part 81 seals so that the compressed air A inside the casing 31 does not leak toward the combustion gas flow passage Pg through the gap between the contact surfaces of the outlet flange 210 and the seal member 7. The first engaging part 81 of this embodiment is composed of the main body part 70, the third protrusion 73, and the fourth protrusion 74. The first engaging part 81 of this embodiment is a groove formed by the surface of the main body part 70 facing the upstream side in the rotor axis direction Da, the surface of the third protrusion 73 facing the outer side in the radial direction Dr, and the surface of the fourth protrusion 74 facing the downstream side in the rotor axis direction Da. In this embodiment, the first engaging part 81 is engaged with the outlet flange 210 of the transition piece 21 as the circumferential flange portion 210a is fitted into the groove that is the first engaging part 81.

A second seal surface 70a that comes in contact with the surface of the outlet flange 210 facing the downstream side in the rotor axis direction Da is formed in the surface of the main body part 70 facing the upstream side in the rotor axis direction Da. Specifically, a differential pressure between the pressure of the compressed air A inside the casing 31 and the pressure on the side of the combustion gas flow passage Pg acts on the surface of the outlet flange 210, facing the downstream side in the rotor axis direction Da, toward the downstream side in the rotor axis direction Da. As a result, the surface of the outlet flange 210 facing the downstream side in the rotor axis direction Da is pressed against the surface facing the upstream side in the rotor axis direction Da of the main body part 70 that is located on the downstream side of the outlet flange 210 in the rotor axis direction Da. Accordingly, during normal operation of the gas turbine, the surface of the main body part 70 facing the upstream side in the rotor axis direction Da is sealed by coming in contact with the surface of the outlet flange 210 facing the downstream side in the rotor axis direction Da. Thus, the second seal surface 70a is formed in the surface of the main body part 70 facing the upstream side in the rotor axis direction Da. A first contact part 141 that is a contact part of the transition piece 21 being the first member is formed in the surface of the outlet flange 210 that faces the downstream side in the rotor axis direction Da and comes in contact with the second seal surface 70a.

The second engaging part 82 seals so that the compressed air A inside the casing 31 does not leak from the gap between the projection 424 and the seal member 7 toward the combustion gas flow passage Pg. The second engaging part 82 of this embodiment is composed of the main body part 70, the first protrusion 71, and the second protrusion 72. Specifically, the second engaging part 82 of this embodiment is a groove formed by the surface of the main body part 70 facing the downstream side in the rotor axis direction Da, the surface of the first protrusion 71 facing the inner side in the radial direction Dr, and the first seal surface 721a of the second protrusion 72. The second engaging part 82 opens toward the downstream side in the rotor axis direction Da. In this embodiment, the first seal surface 721a comes in contact with the surface of the projection 424 facing the inner side in the radial direction Dr as the projection 424 is fitted into the groove that is the second engaging part 82. Thus, the second engaging part 82 is engaged with the projection 424 of the inner shroud 45.

The heat-resistant coating 130 is a coating applied to the surfaces of members exposed to the combustion gas G to enhance the heat resistance of these members. Also called a thermal barrier coating (TBC), the heat-resistant coating 130 of this embodiment functions as a protective film that suppresses thermal damage to the surfaces of the members caused by the combustion gas G. The heat-resistant coating 130 of this embodiment is formed on the transition piece 21 and the first vane 41a.

The heat-resistant coating 130 applied to the transition piece 21 is formed to a predetermined film thickness on the inner peripheral surface 21a of the transition piece 21 facing the combustion gas flow passage Pg, and on the first end face 101 facing the downstream side in the rotor axis direction Da, on the side of the face closer to the combustion gas flow passage Pg. The heat-resistant coating 130 formed on the first end face 101 is formed so as to extend to the inner peripheral surface 21a from a position that is a part of the outer side of the main body first end face 111 in the radial direction Dr and close to the combustion gas flow passage Pg.

The heat-resistant coating 130 applied to the first vane 41a is formed to a predetermined film thickness on the outer surface of the vane main body 42, the gas path surface 441 of the inner shroud 45, and the side of the second end face 102 closer to the combustion gas flow passage Pg. The heat-resistant coating 130 formed on the second end face 102 is formed so as to extend to the gas path surface 441 from a position that is a part of the outer side of the lateral end face 461 in the radial direction Dr and close to the combustion gas flow passage Pg.

As shown in FIG. 3, in this embodiment, even if a difference in thermal elongation in the rotor axis direction Da occurs between the first end face 101 and the second end face 102 having the heat-resistant coatings 130 due to temperature changes of the combustion gas G flowing through the combustion gas flow passage Pg, a predetermined clearance is always secured in the rotor axis direction Da, so that these surfaces do not come in contact with each other. Specifically, as will be described later, in the case of this embodiment, even if the transition piece 21 and the first vane 41a approach each other, the first end face 101 and the seal member 7 come in contact with each other, while the second end face 102 and the seal member 7 come in contact with each other. Thus, the transition piece 21 and the first vane 41a indirectly come in contact with each other through the seal member 7, but do not directly come in contact with each other. As a result, a predetermined clearance in the rotor axis direction Da is always left between the transition piece 21 and the first vane 41a.

Specifically, the contact part 140 in the seal structure of this embodiment includes the first contact part 141 and the second contact part 142. The first contact part 141 is formed in the surface of the outlet flange 210 (flange first end face 121) that forms a part of the first end face 101 and faces the downstream side in the rotor axis direction Da. The second contact part 142 is formed in the surface of the lateral end face 461 that forms a part of the second end face 102 and faces the upstream side in the rotor axis direction Da.

When the transition piece 21 and the first vane 41a move relatively toward each other, the first end face 101 of the first contact part 141 comes in contact with the second seal surface 70a, formed in the seal member 7, at the first contact part 141. When the transition piece 21 and the first vane 41a move relatively toward each other, the second end face 102 of the second contact part 142 comes in contact with the third seal surface 75a, formed in the seal member 7, at the second contact part 142. Meanwhile, a clearance is left between the first end face 101 and the second end face 102. Thus, the first contact part 141 and the second contact part 142 restrict the relative movement of the first end face 101 and the second end face 102 in the rotor axis direction Da through the seal member 7.

Specifically, when the transition piece 21 and the first vane 41a move relatively in the rotor axis direction Da so as to come closest to each other, the first contact part 141 is in contact with the second seal surface 70a of the seal member 7. In this state, the second contact part 142 is at the same time in contact with the third seal surface 75a of the seal member 7. However, even in this case, a certain clearance is always left between the first end face 101 and the second end face 102. In other words, if the transition piece 21 being the first member and the first vane 41a being the second member move relatively toward each other, a clearance is left between the first end face 101 and the second end face 102 that have the heat-resistant coatings 130. In this state, the transition piece 21 being the first member and the first vane 41a being the second member are in contact with each other through the seal member 7 being the third member, further on the outer side of the combustion gas flow passage Pg (the inner side or the outer side in the radial direction Dr) than the heat-resistant coatings 130. Thus, in this embodiment, the transition piece 21 and the first vane 41a are indirectly in contact with each other through the contact part 140 composed of the first contact part 141 and the second contact part 142.

Thus, if the transition piece 21 and the first vane 41a move relatively in the rotor axis direction Da so as to approach each other, the contact part 140 (the first contact part 141, the second contact part 142) of the first embodiment leaves a clearance between the first end face 101 (111) and the lateral end face 461. In this state, the contact part 140 restricts the relative movement of the transition piece 21 and the first vane 41a in the rotor axis direction Da.

Next, the workings of the gas turbine 1 having the above configuration will be described.

According to the gas turbine 1 of this embodiment, the compressed air A from the compressor 10 enters inside the casing 31 of the turbine 30 and flows into the combustor 20. In the combustor 20, fuel supplied from the outside is combusted along with the compressed air A inside the combustor basket 22a to generate the combustion gas G. The combustion gas G flows through the transition piece 21 into the combustion gas flow passage Pg of the turbine 30. While passing through the combustion gas flow passage Pg, the combustion gas G comes in contact with the blade main bodies 37 and rotates the turbine rotor 33 around the rotor axis Ar.

When flowing from the transition piece 21 into the combustion gas flow passage Pg, the combustion gas G impinges on the leading edge 421 of the vane main body 42. Thus, part of the combustion gas is entrapped and flows into the cavity C through the clearance formed between the rear end 211 of the transition piece 21 and the inner shroud 45. As a result, the surfaces of the main body part 70 and the first protrusion 71 of the seal member 7 facing the combustion gas flow passage Pg are exposed to the high-temperature combustion gas G.

During operation of the gas turbine 1, the pressure inside the casing 31 is higher than the pressure inside the cavity C communicating with the combustion gas flow passage Pg. Accordingly, the surface of the main body part 70 of the seal member 7 facing the upstream side in the rotor axis direction Da and the surface of the outlet flange 210 facing the downstream side in the rotor axis direction Da come in contact with each other at the first contact part 141 and the second seal surface 70a. Moreover, the first seal surface 721a of the contact seal member 721 fixed to the second protrusion 72 and the surface of the projection 424 located on the inner side in the radial direction Dr come in contact with each other. Thus, the space inside the casing 31 and the cavity C are sealed off from each other.

Specifically, the first seal surface 721a of the contact seal member 721 provided in the second protrusion 72 is pressed against the surface of the projection 424 facing the inner side in the radial direction Dr. The second seal surface 70a is pressed against the surface of the circumferential flange portion 210a facing the downstream side in the rotor axis direction Da. Thus, the gap between the first seal surface 721a and the surface of the projection 424 facing the inner side in the radial direction Dr is sealed. Moreover, the gap between the second seal surface 70a and the surface of the circumferential flange portion 210a facing the downstream side in the rotor axis direction Da are sealed.

In this state, part of the compressed air A supplied from the compressor 10 into the casing 31 flows into the cooling channels 80 of the seal member 7 and thereby cools the seal member 7 itself. Specifically, the compressed air A inside the casing 31 flows from the inflow port 80b into the radial channel 802, flows through the axial channel 801, and jets out of the opening 80a into the cavity C. As a result, the main body part 70 and the first protrusion 71 exposed to the combustion gas G are cooled.

According to the seal structure 100 as has been described above, the contact part 140 (the first contact part 141 and the second contact part 142) restricts the relative movement of the transition piece 21 and the first vane 41a in the rotor axis direction Da toward each other by coming in contact with the lateral end face 461 in a state where a clearance is left between the main body first end face 111 (first end face 101) and the lateral end face 461. As a result, it is possible to prevent contact between the heat-resistant coating 130 formed on the main body first end face 111 and the heat-resistant coating 130 formed on the lateral end face 461

Specifically, during startup or shutdown of operation of the gas turbine, the main body first end face 111 and the lateral end face 461 come in contact with each other due to the difference in thermal elongation between the transition piece 21 and the inner shroud 45. This may result in damage to the heat-resistant coatings 130.

In the first embodiment, however, before the main body first end face 111 and the lateral end face 461 directly come in contact with each other, the contact part 140 (the first contact part 141 and the second contact part 142) comes in contact with the region of the lateral end face 461 on the outer side in the radial direction Dr where the heat-resistant coating 130 is not formed. Thus, the relative movement of the transition piece 21 and the first vane 41a in the rotor axis direction Da can be restricted by the seal member 7 so that the main body first end face 111 and the lateral end face 461 do not approach each other in the rotor axis direction Da. It is therefore possible to prevent direct contact between the main body first end face 111 of the transition piece 21 on which the heat-resistant coating 130 is formed and the lateral end face 461 of the adjacent first vane 41a on which the heat-resistant coating 130 is formed. Accordingly, damage to the heat-resistant coatings 130 can be prevented.

The first member in the seal structure 100 is the transition piece 21 of the combustor 20. The second member is the first vane 41a adjacent to the downstream side of the transition piece 21 in the rotor axis direction Da. The third member is the seal member 7 disposed between the transition piece 21 and the first vane 41a. Thus, the seal structure 100 that can protect the heat-resistant coating 130 in the vicinity of the outlet opening of the transition piece 21 can be easily employed.

The clearance forming portion 75 protruding from the end face 71a of the seal member 7 toward the downstream side in the rotor axis direction Da is provided. Thus, even if the end face 71a and the lateral end face 461 of the inner shroud 45 approach each other, the openings 80a can be prevented from being blocked.

Specifically, in this embodiment, the clearance forming portion 75 protrudes further toward the downstream side in the rotor axis direction Da than the end face 71a where the openings 80a are formed. Thus, even if the clearance between the end face 71a of the first protrusion 71 and the lateral end face 461 of the inner shroud 45 is reduced, before the openings 80a are blocked, the third seal surface 75a formed in the end face of the clearance forming portion 75 located on the downstream side in the rotor axis direction Da comes in contact with the second contact part 142 formed in the lateral end face 461. Thus, a space can be stably secured on the downstream side of the openings 80a in the rotor axis direction Da. It is therefore possible to stably and continuously discharge the required cooling air from the openings 80a, even if the clearance between the end face 71a and the lateral end face 461 is reduced.

Accordingly, the openings 80a can be prevented from being blocked. Thus, the compressed air A as cooling air can be stably passed through the axial channel 801 and the radial channel 802. As a result, the seal member 7 can be stably cooled.

The openings 80a provided in the end face 71a are formed in a certain region extending in the circumferential direction Dc, at positions including the position that is, relative to the position in the circumferential direction Dc at which the leading edge 421 of the vane main body 42 is formed, located on the upstream side in the rotor axis direction Da and corresponds to that position. Thus, it is possible to partially and effectively cool the vicinity of the leading edge 421 that tends to reach a high temperature as the combustion gas G flowing from the transition piece 21 into the combustion gas flow passage Pg impinges on the leading edge 421.

Specifically, the combustion gas G impinges on the leading edge 421. As a result, part of the combustion gas G is more likely to flow into the cavity C through the clearance between the rear end 211 of the transition piece 21 and the end face 71a of the inner shroud 45, in the part located on the upstream side of the leading edge 421 in the rotor axis direction Da than in the other part in the circumferential direction Dc. Thus, in the part located on the upstream side of the leading edge 421 in the rotor axis direction Da, the main body part 70 and the first protrusion 71 reach higher temperatures due to the entrapped combustion gas G.

For this reason, the plurality of cooling channels 80 are disposed in the circumferential direction Dc in the first protrusion 71 that is a certain region in the circumferential direction Dc, at positions including the position corresponding to the upstream side of the leading edge 421 in the rotor axis direction Da, and the openings 80a are provided at the ends of the cooling channels 80 on the downstream side in the axial direction. This makes it possible to efficiently supply cooling air to the part of the main body part 70 and the first protrusion 71 that reaches a higher temperature, and to thereby cool the seal member 7 in the circumferential direction Dc. As a result, the flow rate of cooling air passed through the cooling channels 80 to cool the main body part 70 and the first protrusion 71 of the seal member 7 can be reduced. Accordingly, the flow rate of the compressed air A used as cooling air can be reduced, so that performance degradation of the gas turbine 1 can be suppressed.

Second Embodiment

Next, a seal structure 200 of a second embodiment will be described with reference to FIG. 7 and FIG. 8.

In the second embodiment, the same components as in the first embodiment will be given the same reference signs and a detailed description thereof will be omitted. The seal structure 200 of the second embodiment is different from the seal structure of the first embodiment in that the former is formed in the ring segments 60 adjacent to each other in the circumferential direction Dc.

The seal structure 200 according to the second embodiment of the present invention will be described below. FIG. 7 shows the structure of the ring segment 60 in cross-section as seen from the circumferential direction Dc. FIG. 8 shows the structure of the ring segments 60 in cross-section as seen from the rotor axis direction Da.

The seal structure 200 of the second embodiment is used for the ring segments 60 adjacent to each other in the circumferential direction Dc. The seal structure 200 of the second embodiment relates to a structure for sealing the gap between a pair of ring segments 60 adjacent to each other in the circumferential direction Dc, without causing damage to thermal barrier coatings formed on the pair of ring segments 60.

Figure 7:
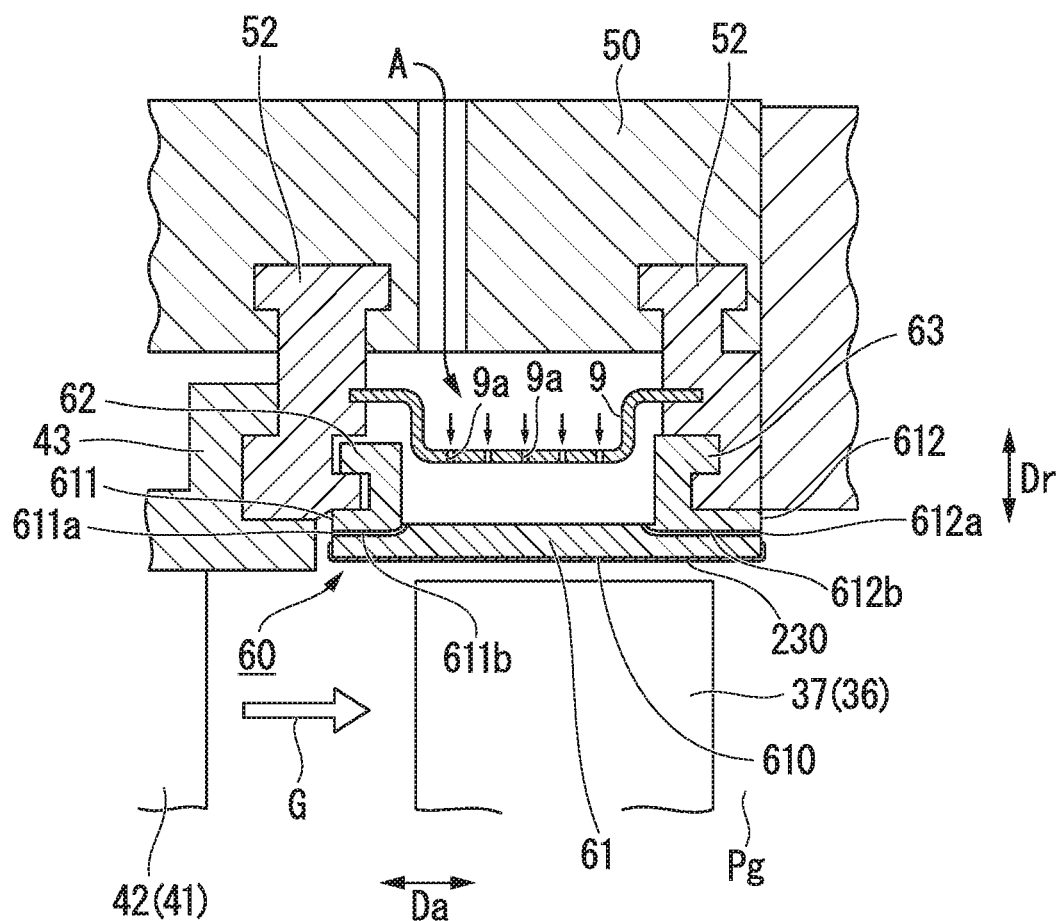
FIG. 7 is an enlarged view of main parts illustrating a ring segment in a second embodiment of the present invention.

As shown in FIG. 7, the ring segment 60 has a ring segment main body 61, an upstream-side hook 62, and a downstream-side hook 63. The ring segment main body 61 spreads in the circumferential direction Dc. The upstream-side hook 62 extends from the upstream side of the ring segment main body 61 in the rotor axis direction Da toward the outer side in the radial direction Dr. The downstream-side hook 63 extends from the downstream side of the ring segment main body 61 in the rotor axis direction Da toward the outer side in the radial direction Dr.

The ring segment main body 61 is mounted on the heat shield ring 52 through the upstream-side hook 62 and the downstream-side hook 63 and supported on the blade ring 50. The ring segment main body 61 has a ring segment gas path surface 610 facing the combustion gas flow passage Pg and lateral surfaces intersecting with the ring segment gas path surface 610. The ring segment main body 61 has an upstream-side end face 611 facing the upstream side in the rotor axis direction Da and a downstream-side end face 612 facing the downstream side in the rotor axis direction Da.

Cooling channels extending in the rotor axis direction Da are formed in the ring segment main body 61. Specifically, as the cooling channels, an upstream-side channel 611b and a downstream-side channel 612b are formed inside the ring segment main body 61. The upstream-side channel 611b extends in the rotor axis direction Da, from the surface that is located on the side opposite to the ring segment gas path surface 610 and faces the outer side in the radial direction Dr toward an upstream-side opening 611a. The downstream-side channel 612b extends in the rotor axis direction Da, from the surface that is located on the side opposite to the ring segment gas path surface 610 and faces the outer side in the radial direction Dr toward a downstream-side opening 612a. These cooling channels are merely an example, and the cooling channels are not limited to this example.

Figure 8:
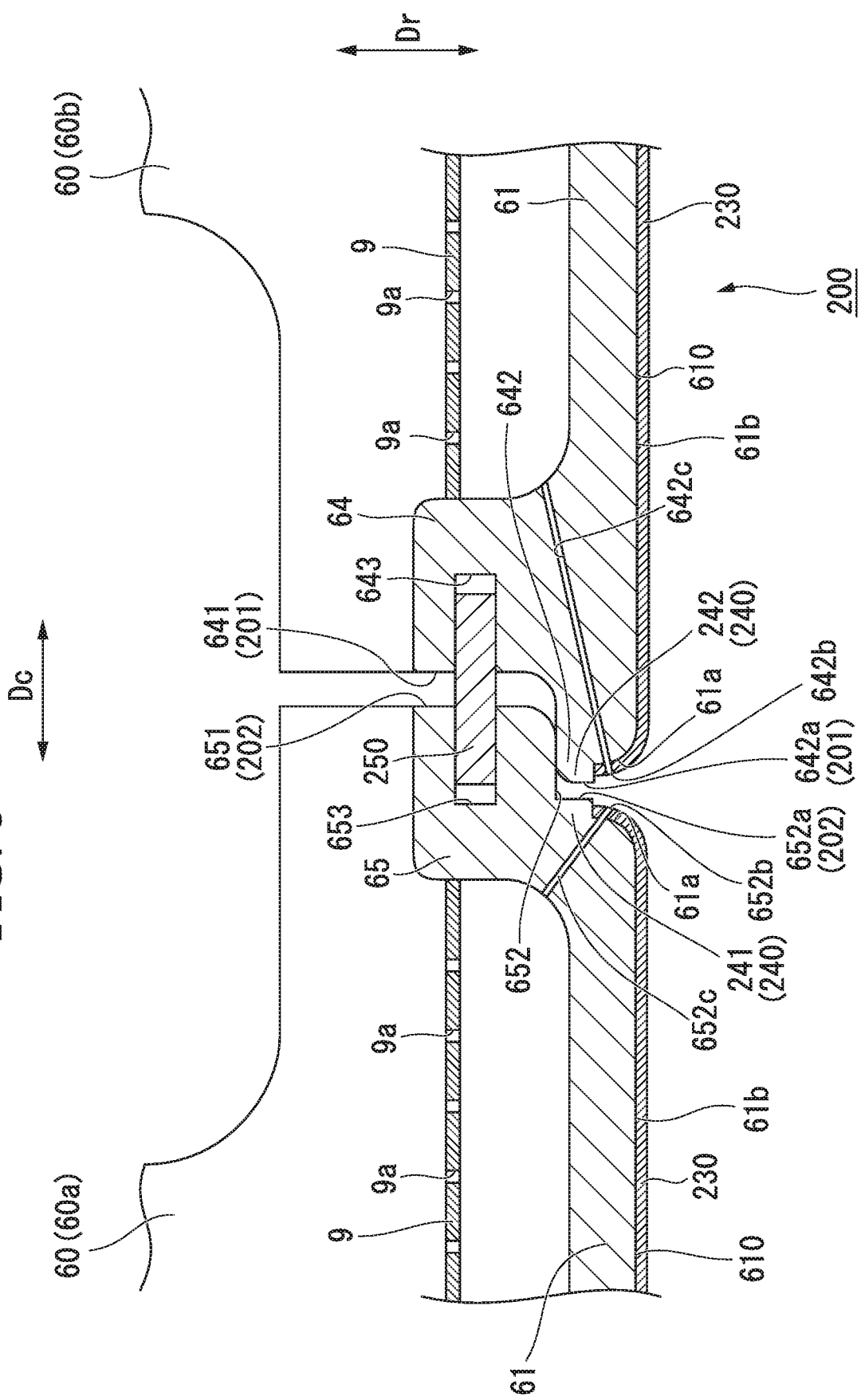
FIG. 8 is a sectional view of main parts illustrating a seal structure in the second embodiment of the present invention.

Here, the front side in the rotation direction of the blades 36 rotating around the rotor axis Ar will be referred to as the front side in the circumferential direction Dc (the left side in the sheet of FIG. 8), and the rear side in the rotation direction will be referred to as the rear side in the circumferential direction Dc (the right side in the sheet of FIG. 8).

The ring segment 60 has a front engaging part 65 provided on the front side in the circumferential direction Dc of the adjacent ring segment main body 61, and the rear engaging part 64 provided on the rear side in the circumferential direction Dc of the adjacent ring segment main body 61. In this embodiment, as shown in FIG. 8, the pair of ring segments 60 adjacent to each other in the circumferential direction Dc will be taken as an example to describe the front engaging part 65 and the rear engaging part 64.

The rear engaging part 64 has a rear end face 641 that intersects with the ring segment gas path surface 610 and faces the front side in the circumferential direction Dc. The rear engaging part 64 has a protrusion 642 that protrudes in the circumferential direction Dc from the rear end face 641, and a rear groove 643 that is recessed from the rear end face 641 in the circumferential direction Dc and extends in the rotor axis direction Da.

The protrusion 642 protrudes from the rear end face 641 toward the front side in the circumferential direction Dc so as to face the combustion gas flow passage Pg. In the protrusion 642, the surface on the side closer to the combustion gas flow passage Pg is formed as a member that extends the ring segment gas path surface 610 toward the front side in the circumferential direction Dc. In the protrusion 642, a protrusion end face 642a facing the front side in the circumferential direction Dc is formed on the leading end side in the protrusion direction. On the side of the protrusion end face 642a closer to the combustion gas flow passage Pg, a main body lateral outer surface 61a recessed from the protrusion end face 642a toward the rear side in the circumferential direction Dc is formed. The main body lateral outer surface 61a forms a part of the protrusion end face 642a. The main body lateral outer surface 61a is connected through a smooth surface to a main body outer surface 61b that spreads along the ring segment gas path surface 610 of the ring segment main body 61. The surfaces of the main body lateral outer surface 61a and the main body outer surface 61b are covered with a ring segment heat-resistant coating 230 to be described later.

The rear groove 643 is formed on the outer side of the combustion gas flow passage Pg. Specifically, the rear groove 643 is formed further on the outer side in the radial direction Dr than the protrusion 642. The rear groove 643 is an angular groove depressed from the rear end face 641 toward the rear side in the circumferential direction Dc.

The front engaging part 65 has a front end face 651 that intersects with the ring segment gas path surface 610 and faces the rear side in the circumferential direction Dc. The front end face 651 faces the rear end face 641 of the adjacent ring segment 60 across a distance. The front engaging part 65 has a recess 652 that is recessed from the front end face 651 toward the front side in the circumferential direction Dc, and a front groove 653 that is recessed from the front end face 651 toward the front side in the circumferential direction Dc and extends in the rotor axis direction Da.

In a cross-section seen from the rotor axis direction Da, the recess 652 has a shape recessed at a corner so that the protrusion 642 can be fitted from the circumferential direction Dc. The recess 652 is formed at the corner where the ring segment gas path surface 610 and the front end face 651 intersect with each other. The recess 652 has a recess end face 652a that is located further on the front side in the circumferential direction Dc than the front end face 651 and faces the rear side in the circumferential direction Dc. As in the protrusion 642, a main body lateral outer surface 61a recessed from the recess end face 652a toward the front side in the circumferential direction Dc is formed in the recess end face 652a, on the side of the face closer to the combustion gas flow passage Pg. The main body lateral outer surface 61a forms a part of the recess end face 652a. The main body lateral outer surface 61a is connected through a smooth surface to the main body outer surface 61b that spreads along the ring segment gas path surface 610 of the ring segment main body 61. The surfaces of the main body lateral outer surface 61a and the main body outer surface 61b are covered with the ring segment heat-resistant coating 230 to be described later.

The front groove 653 is formed on the outer side of the combustion gas flow passage Pg. Specifically, the front groove 653 is formed further on the outer side in the radial direction Dr than the recess 652. The front groove 653 is formed at the same position in the radial direction Dr as the rear groove 643. The front groove 653 is an angular groove depressed toward the front side in the circumferential direction Dc.

An impingement plate 9 supported by the heat shield ring 52 is provided between the outer side of the ring segment 60 in the radial direction Dr and the casing 31. The impingement plate 9 has a sheet-like shape, and has a plurality of air holes 9a penetrating the impingement plate 9 in the radial direction Dr toward the ring segment 60.

The seal structure 200 of the second embodiment includes the front engaging part 65 of one ring segment 60a, the rear engaging part 64 of the other ring segment 60b, a seal plate 250, the ring segment heat-resistant coating 230, and a ring segment contact part 240. The front engaging part 65 is disposed on the front side in the circumferential direction Dc in the pair of adjacent ring segments 60. The rear engaging part 64 is disposed on the rear side in the circumferential direction Dc. The seal plate 250 is disposed between the front engaging part 65 and the rear engaging part 64. The ring segment heat-resistant coating 230 is formed on the surfaces of the ring segments 60 exposed to the combustion gas G. The ring segment contact part 240 restricts the relative movement of the pair of adjacent ring segments 60 toward each other.

In the seal structure 200 of the second embodiment, the rear engaging part 64 of the one ring segment 60b of the pair of ring segments 60 adjacent to each other in the circumferential direction corresponds to a first member. In the seal structure 200, the front engaging part 65 of the other ring segment 60a adjacent to the rear side of the ring segment 60a in the circumferential direction Dc corresponds to a second member.

Accordingly, the face of the rear engaging part 64 facing the front side in the circumferential direction Dc is a first end face 201 in the second embodiment. The face of the front engaging part 65 facing the rear side in the circumferential direction Dc is a second end face 202 in the second embodiment. The first end face 201 of the second embodiment is the rear end face 641 and the protrusion end face 642a. The second end face 202 of the second embodiment is the front end face 651 and the recess end face 652a.

The seal plate 250 is disposed between the front end face 651 and the rear end face 641. The seal plate 250 is a seal member that seals the gap between the front end face 651 and the rear end face 641 through the front groove 653 and the rear groove 643. The seal plate 250 is a third member in the seal structure 200 of the second embodiment. The seal plate 250 engages with the adjacent ring segments 60 between the rear end face 641 that is the first end face 201 and the front end face 651 that is the second end face 202.

The seal plate 250 of this embodiment is disposed on the outer side of the combustion gas flow passage Pg through which the combustion gas G flows. As shown in FIG. 8, the seal plate 250 is inserted into the rear groove 643 of the rear end face 641 and the front groove 653 of the front end face 651. The seal plate 250 has a rectangular shape in a longitudinal section orthogonal to the rotor axis Ar. The seal plate 250 extends in the rotor axis direction Da.

The ring segment heat-resistant coating 230 is a TBC film applied to the surfaces of the ring segments 60 to enhance the heat resistance of members exposed to the combustion gas G. The ring segment heat-resistant coating 230 of this embodiment is formed to a predetermined film thickness as with the heat-resistant coating 130 of the first embodiment.

As described above, the ring segment heat-resistant coating 230 is formed on the main body lateral outer surface 61a of the ring segment main body 61. Specifically, the ring segment heat-resistant coating 230 is formed on the main body lateral outer surface 61a, on the side of the protrusion end face 642a closer to the combustion gas flow passage Pg that is the side closer to the ring segment gas path surface 610, with the position recessed from the protrusion end face 642a toward the rear side in the circumferential direction Dc serving as a border. Similarly, in the recess end face 652a facing the protrusion end face 642a in the circumferential direction Dc, the ring segment heat-resistant coating 230 is formed on the main body lateral outer surface 61a, on the side of the recess end face 652a closer to the combustion gas flow passage Pg that is the side closer to the ring segment gas path surface 610, with the position recessed from the recess end face 652a toward the front side in the circumferential direction Dc serving as a border. At the border in each of the protrusion end face 642a and the recess end face 652a, the heat-resistant coating 230 has such a film thickness that the coating does not protrude toward the front side or the rear side in the circumferential direction Dc from the protrusion end face 642a or the recess end face 652a extending in the circumferential direction Dc. Thus, even if the protrusion end face 642a and the recess end face 652a come in contact with each other in the circumferential direction Dc, the adjacent heat-resistant coatings 230 do not come in contact with each other in the circumferential direction Dc. As a result, a slight clearance is always left in the circumferential direction Dc.

The ring segment contact part 240 is disposed on the outer side of the ring segment heat-resistant coatings 230 relative to the combustion gas flow passage Pg. The ring segment contact part 240 of the second embodiment is disposed at a position farther away from the combustion gas flow passage Pg than the position at which the ring segment heat-resistant coatings 230 of the protrusion end face 642a and the recess end face 652a are formed. When the pair of adjacent ring segments 60 move toward each other in the circumferential direction Dc, the ring segment contact part 240 leaves a clearance between the ring segment heat-resistant coatings 230 adjacent to each other in the circumferential direction Dc. In this state, the protrusion end face 642a and the recess end face 652a disposed on the outer side of the combustion gas flow passage Pg come in contact with each other in the circumferential direction Dc. As a result, the ring segment contact part 240 restricts the relative movement of the pair of ring segments 60 in the circumferential direction Dc.

The ring segment contact part 240 of the second embodiment includes a first contact part 241 formed in the recess end face 652a and a second contact part 242 formed in the protrusion end face 642a.

In the region of the protrusion end face 642a where the ring segment heat-resistant coating 230 is formed, a plurality of cooling channels (front-side channels 642c) are formed at intervals in the rotor axis direction Da. The cooling channel (front-side channel 642c) has one end communicating with a ring segment cavity and the other end connecting to a rear-side opening 642b having a circular shape. In the region of the recess end face 652a where the ring segment heat-resistant coating 230 is formed, a plurality of cooling channels (rear-side channels 652c) are formed at intervals in the rotor axis direction Da. The cooling channel (rear-side channel 652c) has one end communicating with the ring segment cavity and the other end connecting to a front-side opening 652b having a circular shape.

Next, the workings of the gas turbine 1 having the above configuration will be described.

According to the gas turbine 1 of this embodiment, part of the compressed air A from the compressor 10, or the compressed air A extracted from the compressor 10, is also supplied as cooling air to the regions on the outer side of the outer shroud 43 in the radial direction Dr and the inner side of the inner shroud 45 in the radial direction Dr to cool the outer shroud 43 and the inner shroud 45 of the vane 41. That part of the compressed air A, or that compressed air A extracted from the compressor 10, flowing from the compressor 10 into the casing 31 is also supplied to the regions on the inner side of the casing 31 in the radial direction Dr that is the outer side of the blade ring 50 in the radial direction Dr. To cool the ring segments 60, the compressed air A flows through the blade ring 50 toward the outer side in the radial direction Dr of the ring segments 60 that are disposed on the inner side of the blade ring 50 in the radial direction Dr.

The compressed air A supplied to the outer side of the ring segment 60 in the radial direction Dr blows out through the plurality of air holes 9a in the impingement plate 9 toward the inner side in the radial direction Dr, and thereby performs impingement cooling on the surface of the ring segment main body 61 on the outer side in the radial direction Dr. After performing impingement cooling, the compressed air A flows into the upstream-side channel 611b and the downstream-side channel 612b of the ring segment main body 61. Thereafter, the compressed air A flows toward the upstream side and the downstream side in the rotor axis direction Da, and thereby perform convection cooling on the upstream-side end face 611 and the downstream-side end face 612.

After performing impingement cooling, the compressed air A flows into the front-side channels 642c and the rear-side channels 652c and flows toward the front side and the rear side in the circumferential direction Dc, thereby performing convection cooling on the protrusion end face 642 and the recess end face 652a.

According to the seal structure 200 as has been described above, the first contact part 241 formed in the recess end face 652a and the second contact part 242 formed in the protrusion end face 642a come in contact with each other in the state where a clearance is left between the ring segment heat-resistant coatings 230 of the ring segments 60 adjacent to each other in the circumferential direction Dc. Thus, the relative movement of the adjacent ring segments 60a, 60b in the circumferential direction Dc toward each other is restricted. As a result, it is possible to prevent contact between the ring segment heat-resistant coating 230 formed on the recess end face 652a and the ring segment heat-resistant coating 230 formed on the protrusion end face 642a.

Specifically, in the second embodiment, the ring segment heat-resistant coatings 230 are formed further on the side closer to the combustion gas flow passage Pg than the first contact part 241 and the second contact part 242, with the first contact part 241 and the second contact part 242 serving as the borders. The ring segment heat-resistant coatings 230 are formed to such a film thickness that the coatings do not protrude in the circumferential direction Dc beyond the first contact part 241 and the second contact part 242. Thus, even if the first contact part 241 formed in the recess end face 652a and the second contact part 242 formed in the protrusion end face 642a come in contact with each other, the first contact part 241 and the second contact part 242 do not come in contact with the ring segment heat-resistant coatings 230, but a slight clearance is left therebetween, so that no damage is caused to the ring segment heat-resistant coatings 230. That is, even if the ring segments 60a, 60b adjacent to each other in the circumferential direction Dc move toward each other in the circumferential direction Dc and the recess end face 652a and the protrusion end face 642a are about to come in contact with each other, the first contact part 241 and the second contact part 242 first come in contact with each other. As a result, a situation is avoided where the recess end face 652a and the protrusion end face 642a further approach each other and directly come in contact with the ring segment heat-resistant coatings 230.

The high-temperature combustion gas G entrapped by the rotation of the blades 36 is retained in the clearance located further on the inner side in the radial direction Dr than the seal plate 250, between the recess end face 652a and the protrusion end face 642a of the adjacent ring segments 60a, 60b. Accordingly, the outer surface temperatures of the ring segments 60a, 60b rise, and oxidation thinning is likely to progress at the corners of the ring segments 60a, 60b. In this embodiment, however, the rear-side channels 652c and the front-side channels 642c are formed respectively in the recess end face 652a and the protrusion end face 642a of the ring segments 60a, 60b adjacent to each other in the circumferential direction Dc. Thus, the compressed air A is jetted out of the rear-side openings 642b and the front-side openings 652b so as to hit and cool the opposite recess end face 652a and protrusion end face 642a. It is therefore possible to promote the cooling of the corners of the ring segments 60a, 60b between the recess end face 652a and the protrusion end face 642a where the high-temperature combustion gas G is intensively entrapped and retained.

The first member in the seal structure 200 is the rear engaging part 64 of the one ring segment 60b disposed on the front side in the circumferential direction Dc. The second member is the front engaging part 65 of the other ring segment 60a disposed on the rear side in the circumferential direction Dc. The third member is the seal plate 250. Thus, the seal structure 200 that can protect the ring segment heat-resistant coatings 230 can be easily employed between the pair of ring segments 60a, 60b adjacent to each other in the circumferential direction.

While the embodiments of the present invention have been described above in detail with reference to the drawings, the components, the combinations thereof, etc. in each embodiment are merely examples, and addition, omission, substitution, and other changes can be made to these components within the scope of the gist of the present invention.

The contact part 140 of the first embodiment is not limited to the form in which the contact part 140 is disposed adjacent to the openings 80a in the circumferential direction Dc as in the embodiment. The contact part 140 of the first embodiment should at least be able to leave a space between the end face 71a where the openings 80a are provided and the lateral end face 461 of the inner shroud 45 so as not to block the openings 80a. For example, the contact part 140 of the first embodiment may be formed adjacent to the openings 80a in the radial direction Dr, or may be formed in the second protrusion 72 or the main body part 70.

The openings 80a provided in the seal member 7 of the first embodiment are not limited to the form in which the openings 80a are formed on the upstream side in the rotor axis direction Da of the leading edge 421 of the vane main body 42 as in the embodiment. The openings 80a should be formed at least in array in the circumferential direction Dc. For example, the openings 80a may be formed at equal intervals in the circumferential direction Dc, or may be formed in areas other than the upstream side of the leading edge 421 in the rotor axis direction Da.

In the first embodiment, the openings 80a formed in array in the circumferential direction Dc have the same shape, but the openings 80a are not limited to this example. The openings 80a may have an arbitrary shape according to the position in the circumferential direction Dc. For example, the openings 80a that are formed on the upstream side of the leading edge 421 in the rotor axis direction Da may be of a larger size, while the openings 80a that are formed at positions other than the upstream side of the leading edge 421 in the rotor axis direction Da may be of a smaller size.

In the first embodiment, the cooling channels 80 may be formed in the transition piece 21 or the first vane 41a. For example, the cooling channels 80 having the openings 80a in the main body first end face 111 that is the first end face 101 of the first embodiment, or the cooling channels 80 having the openings 80a in the lateral end face 461 that is the second end face 102 may be formed.

The contact part 140 is not limited to the form of the contact part in the first embodiment or the second embodiment. The contact part 140 should at least be able to restrict the relative movement of the first member and the second member toward each other by coming in contact with one of the first end face 101 and the second end face 102 on the outer side of the heat-resistant coatings 130.

For example, as in the ring segment 60b that is the second member in the second embodiment, the contact part 140 may also be provided in the first vane 41a in addition to the contact part 140 provided in the seal member 7 that is the third member in the first embodiment.

Instead of the pair of adjacent ring segments 60a, 60b being provided respectively with the first contact part 241 and the second contact part 242 as in the second embodiment, only one of the first contact part 241 and the second contact part 242 may be provided. The first contact part 241 and the second contact part 242 may be provided in the front end face 651 or the rear end face 641 instead of in the recess end face 652a and the protrusion end face 642a.

INDUSTRIAL APPLICABILITY

According to the seal structure 100 described above, before the first end face 101 and the second end face 102 come in contact with each other, the contact part 140 comes in contact with the region of the first end face 101 where the heat-resistant coating 130 is not formed. Thus, it is possible to prevent contact between the first end face 101 of the first member on which the heat-resistant coating 130 is formed and the second end face 102 of the second member, adjacent to the first member, on which the heat-resistant coating 130 is formed.

REFERENCE SIGNS LIST

1 Gas turbine
A Compressed air
10 Compressor
20 Combustor
Ac Axis line
21 Transition piece (first member)
21a Inner circumferential surface
210 Outlet flange
210a Circumferential flange portion
211 Rear end
22 Fuel supply unit
22a Combustor basket
30 Turbine
Da Rotor axis direction
Dc Circumferential direction
Dr Radial direction
31 Casing
Ar Rotor axis
33 Turbine rotor
34 Rotor main body
35 Blade row
36 Blade
37 Blade main body
38 Platform
39 Blade root
40 Vane row
41 Vane
42 Vane main body
43 Outer shroud
45 Inner shroud
40a First vane row
41a First vane (second member)
421 Leading edge
44 Shroud main body
441 Gas path surface
46 Lateral wall
461 Lateral end face
424 Projection
50 Blade ring
52 Heat shield ring
60 Ring segment (first member, second member)
G Combustion gas
Pg Combustion gas flow passage
100, 200 Seal structure
101, 201 First end face
111 Main body first end face
121 Flange first end face
102, 202 Second end face
112 Projection second end face
7 Seal member (third member)
C Cavity
70 Main body part
70a Second seal surface
71 First protrusion
71a End face (third end face)
72 Second protrusion
721 Contact seal member
721a First seal surface
73 Third protrusion
74 Fourth protrusion
75 Clearance forming portion
75a Third seal surface (fourth end face)
80 Cooling channel
801 Axial channel
802 Radial channel
80a Opening
80b Inflow port
81 First engaging part
82 Second engaging part
130 Heat-resistant coating
140 Contact part
141 First contact part
142 Second contact part
9 Impingement plate
9a Air hole
61 Ring segment main body
61a Main body lateral outer surface
61b Main body outer surface
610 Ring segment gas path surface
611 Upstream-side end face
611a Upstream-side opening
611b Upstream-side channel
612 Downstream-side end face
612a Downstream-side opening
612b Downstream-side channel
62 Upstream-side hook
63 Downstream-side hook
64 Rear engaging part
641 Rear end face 642 Protrusion
642a Protrusion end face
642b Rear-side opening
642c Front-side channel
643 Rear groove
65 Front engaging part
651 Front end face
652 Recess
652a Recess end face
652b Front-side opening
652c Rear-side channel
653 Front groove
230 Ring segment heat-resistant coating
240 Ring segment contact part
241 First contact part
242 Second contact part
250 Seal plate (third member)

The invention claimed is:

1. A seal structure comprising:
a first member facing a combustion gas flow passage defined around a rotor axis;
a second member facing the combustion gas flow passage and being adjacent to the first member;
a third member on an outer side of the combustion gas flow passage between a first end face of the first member facing downstream and a second end face of the second member facing the first end face, the third member being configured to engage with the first member and the second member;
a heat-resistant coating on at least one of the first end face and the second end face, both of the first end face and the second end face being closer to the combustion gas flow passage with respect to the third member; and
a contact part in each of the first end face and the second end face, further on the outer side of the combustion gas flow passage than the heat-resistant coating, the contact part being configured to, when the first member and the second member move relatively toward each other, restrict relative movement of the first member and the second member by directly coming into contact with the first member and the second member, or indirectly coming into contact with the first member and the second member through the third member, in a state where a clearance is left between the heat-resistant coating and at least one of the first end face and the second end face facing the heat-resistant coating,
wherein the first member is a combustor,
wherein the second member is a vane on a downstream side in a rotor axis direction relative to the combustor,
wherein the third member is a seal member on the outer side of the combustion gas flow passage, and
wherein the seal member includes:
cooling channels defined in a region extending in a circumferential direction based on the rotor axis, at positions including a position on an upstream side in the rotor axis direction relative to a leading edge of the vane facing the upstream side in the rotor axis direction; and
a third end face having a plurality of openings defined in the circumferential direction and configured to discharge cooling air from the cooling channels, the third end face facing downstream.

2. The seal structure according to claim 1, wherein the seal member includes a clearance forming portion that protrudes from the third end face toward the downstream side in the rotor axis direction and that has a fourth end face facing the downstream side in the rotor axis direction.

3. The seal structure according to claim 2, wherein the fourth end face faces the contact part of the second end face of the vane facing the upstream side in the rotor axis direction.

* * * * *